(12) United States Patent
Kim et al.

(10) Patent No.: US 7,440,473 B2
(45) Date of Patent: Oct. 21, 2008

(54) APPARATUS AND METHOD FOR COMPRESSING A HEADER OF A PACKET

(75) Inventors: Soung-Kwan Kim, Suwon-si (KR); Jun-Hwa Seo, Suwon-si (KR); Jae-Seok Park, Weoul (KR); Seong-Yun Ko, Seoul (KR); Young-Sook Ryu, Suwon-si (KR); Hyun-Chul Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 733 days.

(21) Appl. No.: 10/982,933

(22) Filed: Nov. 8, 2004

(65) Prior Publication Data

US 2005/0100051 A1 May 12, 2005

(30) Foreign Application Priority Data

Nov. 8, 2003 (KR) .................. 10-2003-0078892

(51) Int. Cl.
*G06F 15/16* (2006.01)
(52) U.S. Cl. .................... 370/469; 709/247
(58) Field of Classification Search ............... 370/469; 709/247
See application file for complete search history.

(56) References Cited

U.S. PATENT DOCUMENTS

| | | | |
|---|---|---|---|
| 6,314,095 B1 | 11/2001 | Loa | |
| 7,035,287 B2 * | 4/2006 | Tourunen et al. | 370/477 |
| 7,257,116 B2 * | 8/2007 | Poeluev et al. | 370/389 |
| 7,301,947 B2 * | 11/2007 | Tourunen et al. | 370/392 |
| 2002/0038385 A1 * | 3/2002 | Kalliokulju | 709/247 |
| 2002/0059464 A1 * | 5/2002 | Hata et al. | 709/247 |
| 2004/0022252 A1 * | 2/2004 | Jang et al. | 370/395.52 |
| 2004/0039830 A1 * | 2/2004 | Zhang et al. | 709/230 |

OTHER PUBLICATIONS

RFC 1889 (RFC1889), RTP: A Transport Protocol For Real-Time Applications, Network Working Group, Request for Comments: 1889, Internet RFC/STD/FYI/BCP Archives, Schulzrinne et al., Jan. 1996.
RFC 2507 (RFC2507), IP Header Compression, Request for Comments: 2507, Internet RFC/STD/FYI/BCP Archives, Degermark et al., Feb. 1999.
RFC 2508 (RFC2508), Compressing IP/UDP/RTP Headers for Low-Speed Serial Links, Network Working Group, Request for Comments: 2508, Internet RFC/STD/FYI/BCP Archives, Casner et al., Feb. 1999.

* cited by examiner

*Primary Examiner*—Brian D Nguyen
(74) *Attorney, Agent, or Firm*—Robert E. Bushnell, Esq.

(57) ABSTRACT

A packet processing terminal and method for compressing a header of a packet. When it is determined an IP header is to be compressed in order that a terminal removes overhead of a generated packet, an IP header compression option is added to a socket option of a socket generated in order to exchange the packet between an application module and an OS module. And, when the application module sets the IP header compression option, the IP header of the packet is compressed by the OS module using a compression method corresponding to option information of the set IP header compression option.

23 Claims, 8 Drawing Sheets

APPARATUS AND METHOD FOR COMPRESSING A HEADER OF A PACKET

CLAIM OF PRIORITY

This application makes reference to, incorporates the same herein, and claims all benefits accruing under 35 U.S.C. §119 from an application for APPARATUS AND METHOD FOR HEADER COMPRESSION IN PACKET earlier filed in the Korean Intellectual Property Office on 8 Nov. 2003 and there duly assigned Serial No. 10-2003-0078892.

BACKGROUND OF THE INVENTION

1. Field of the Invention

The present invention relates to an apparatus and method for compressing a header of a packet and, more specifically, to an apparatus and method for compressing a header of a packet wherein a delay of packet transmission and a storage area which is wasted unnecessarily are removed by determining an IP header compression of a generated packet using property information of a socket used to transmit data generated in an application layer to an OS (Operation System) layer.

2. Description of the Related Art

Recently, a request for transmitting video or audio data through a network in real time increases.

To satisfy such request, RTP (Real-time Transport Protocol) is prescribed in Network Working Group RFC 1889 (Request For Comment 1889) published by IETF (Internet Engineering Task Force) which is an Internet standardization organization, and the RTP is used to transmit the audio or video data through the network in real time. RTP provides end-to-end network transport functions suitable for applications transmitting real-time data, such as audio, video or simulation data, over multicast or unicast network services.

An IP (Internet Protocol) header added to be transmitted in real time through the network according to the RTP has 20 bytes, a UDP (User Datagram Protocol) header has 8 bytes, and an RTP header has 12 bytes.

Accordingly, since an over header for a packet used to transmit one of data is generated, IPCP (IP Compression Protocol), CRTP (Compression RTP) and ROHC(RObust Header Compression) are prescribed in order to solve such problem.

The IPCP is a technique to compress RTP/UDP/IP header, UDP/IP header and ESP (Encapsulation Security Payload)/IP header, and CRTP and ROHC are techniques to compress IP/UDP/RTP header.

Network Working Group RFC 2507 describes how to compress multiple IP headers and TCP and UDP headers per hop over point to point links. Network Working Group RFC 2508 describes a method for compressing the headers of IP/UDP/RTP datagrams to reduce overhead on low-speed serial links.

U.S. Pat. No. 6,314,095 B1 to Kanchei Loa and entitled METHOD AND

SUMMARY OF THE INVENTION

It is the objective of the present invention to provide an apparatus and method for compressing a header wherein, when determining an IP header compression, to remove an overhead occurred in a packet generated in an application layer, a delay of packet transmission time and a storage area which is wasted unnecessary are removed by using specific information of a socket that an application layer generates to transmit the packet to an OS layer.

According to an aspect of the present invention, there is provided an apparatus for compressing a header of a packet, comprising: a socket option setting unit for providing a socket request signal and setting a socket option generated accordingly in order to transmit an IP header compression packet generated according to a user program; a socket option providing unit for providing a socket option setting unit with the socket option of the socket while generating the socket, when the socket request signal is received from the socket option setting unit; a compression processing unit for compressing the header of the packet, when the socket option setting unit among the options of the socket sets the header compression option; and a transmission processing unit for adding a transmission header to the packet whose header is compressed by the compression compressing unit, and transmitting the header-added packet to other terminal through a network.

Preferably, the apparatus for compressing the header further comprises a decompression unit for identifying header compression method information by analyzing the transmission header of the packet and releasing the header compression of the packet according to the identified compression method information, in the case that the packet is received from other terminal through the network.

According to another aspect of the present invention, there is provided a method for compressing a header of a packet, the method comprising the steps of: generating a socket used to transmit a packet generated according to a user program; setting option information of the socket generated according to the program; determining whether there is compression option information used to compress the header to the set option information; compressing the header of the packet using a compression scheme according to the compression option information when there is the compression option information as a result of the determination; and adding a transmission header in which the compression scheme information is loaded to the packet and transmitting the header to other terminal through the network.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

In the following description, well-know function or construction are not described in detail since they would obscure the invention in unnecessary detail.

Figure 1:
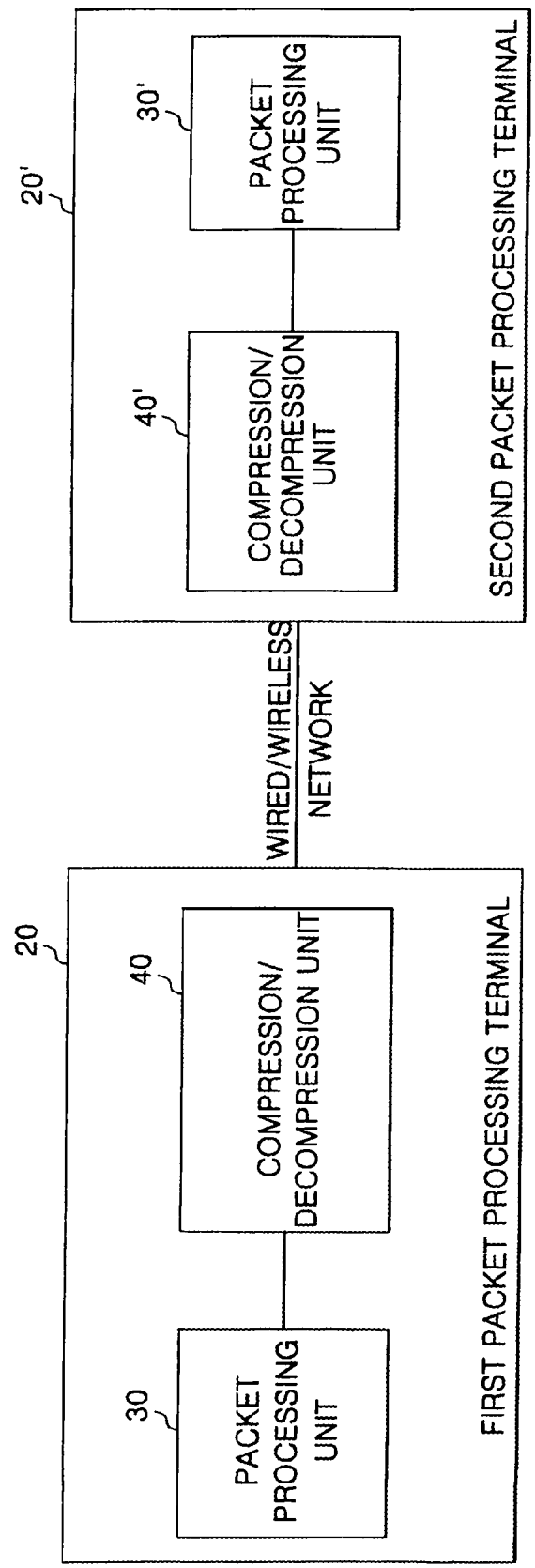
FIG. 1 is a diagram for explaining construction of a packet processing terminal which compresses an IP header and exchanges packets.

FIG. 1 is a diagram for explaining a construction of a packet processing terminal which compresses an IP header and exchanges packets.

Referring to FIG. 1, a first packet processing terminal 20 and a second packet processing terminal 20' are connected to a wired/wireless network, and each of the packet processing terminals 20 and 20' respectively include packet processing units 30 and 30' and compression/decompression units 40 and 40'.

The packet processing units 30 and 30' provide, to the compression/decompression units 40 and 40', a socket request signal to transmit the generated packet and set an option of the socket generated accordingly, when the packet is generated according to a user program.

The packet processing units 30 and 30' transmit the packet to the compression/decompression units 40 and 40' through the generated socket.

When receiving the socket request signal, the compression/decompression units 40 and 40' generate the socket, and provide the packet processing units 30 and 30' with the option of the generated socket.

By analyzing socket option information set by the packet processing units 30 and 30', it is determined whether an IP header of a received packet has to be compressed, and when the received packet is an IP header compression subject as a result of the determination, the packet is compressed according to the IP header compression technique and transmitted to other packet processing terminals 20 and 20' through the wired/wireless network.

The compression/decompression units 40 and 40' determine whether the IP header of the packet, transmitted from the other packet processing terminals 20 and 20' through the wired/wireless network, is compressed. When the IP header is compressed, the compression/decompression units 40 and 40' release the compression according to the compression technique and transmit the packet to the packet processing units 30 and 30'.

At this time, it is desirable that the compression/decompression units 40 and 40' of each of the packet processing terminals 20 and 20' use the same compression technique.

Figure 2:
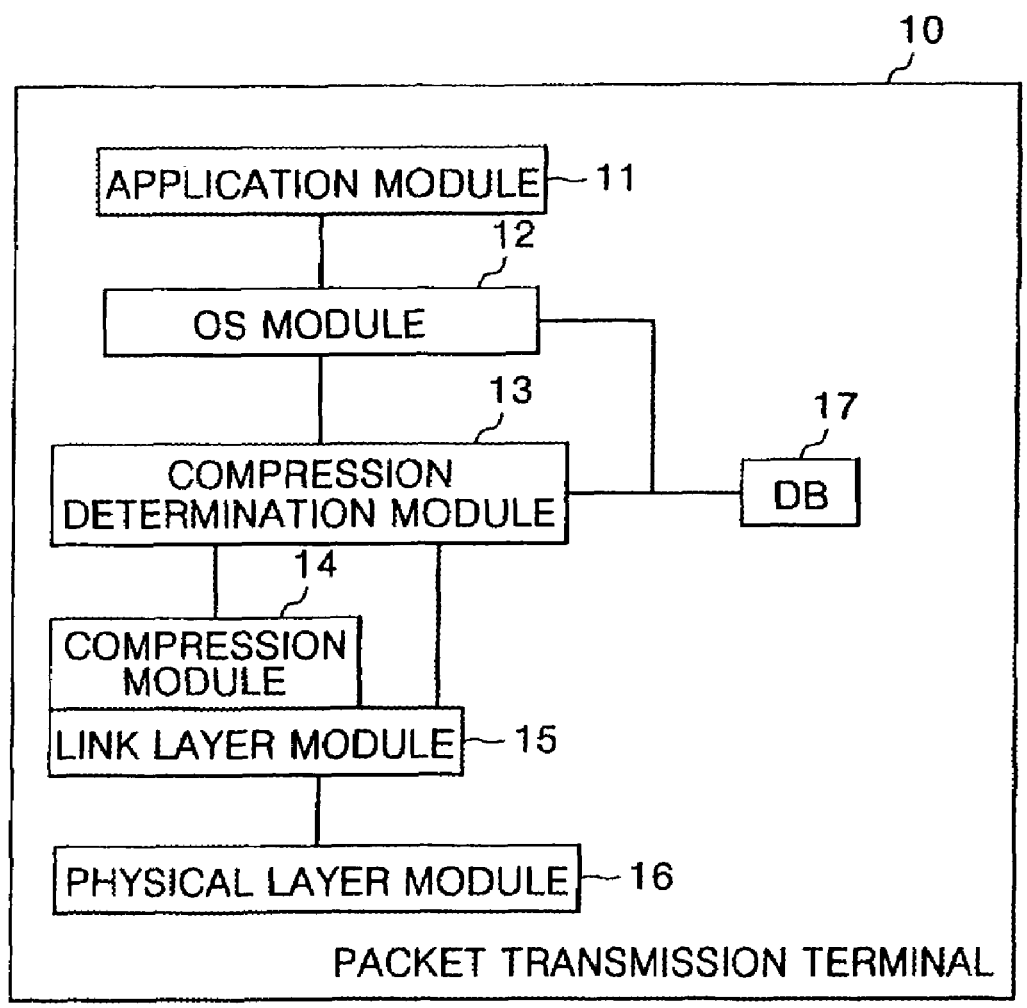
FIG. 2 is a block diagram for explaining an internal construction of a packet transmission terminal for compressing an IP header.

FIG. 2 is a block diagram for explaining an internal construction of a packet transmission terminal for compressing an IP header.

Referring to FIG. 2, a packet transmission terminal 10 includes an application module 11, an OS (Operating System) module 12, a compression determination module 13, a compression module 14, a link layer module 15 and a physical layer module 16, and a database (DB) 17.

The application module 11 provides the OS module 12 with a socket request signal when a packet to be transmitted to other terminal through a network is generated.

The application module 11 sets an option of a socket generated by the OS module 12 and transmits the packet through the generated socket.

When the OS module 12 receives a socket request signal from the application module 11, it generates the socket and receives the packet through the generated socket.

The database 17 stores a compression table, and the compression table is used by compression determination module 13 to determine whether the packet transmitted form the application module 11 includes an IP header to be compressed.

According to IP address information and port number information of the packet transmitted from the application module 11, such compression table stores the compression information of the corresponding packet IP header as a form of table.

The compression determination module 13 identifies the IP address information and port number information of the packet transmitted from the application module 11, searches for the identified IP address information and port information from the compression table stored in the database 17, and determines whether the IP header of the corresponding packet has to be compressed.

That is, the compression determination module 13 identifies the IP address information of the packet and the port address information received by the OS module 12 through the socket, searches for whether the identified IP address information and port address information are the subject of IP header compression according to the compression table stored in the database 17, and determines it.

The compression determination module 13 searches the compression table of the database 17, and transmits the packet received from the application module to 11 to the compression module 14 when the IP address information and port number information of the received packet are the subject of compression. And, the compression determination module transmits the packet to the link layer module 15 when the IP address information and port number information are not subject of compression.

The compression module 14 compresses the IP header of the packet generated in the application module 11.

At this time, the compression module 14 can compress the IP header according to an IPCP (IP Compression Protocol) method, a CRTP (Compressed RTP) method, or an ROHC (Robust Header Compression) method.

The compression module 14 compresses the IP header of the packet, and transmits the packet in which the IP header is compressed to the link layer module 15.

The link layer module 15 adds the link layer header to the received packet and transmits them to the physical layer module 16.

The physical layer module 16 adds the physical layer header to the packet received from the link layer module 15, and transmits them to other terminal through a physically connected network.

Figure 3:
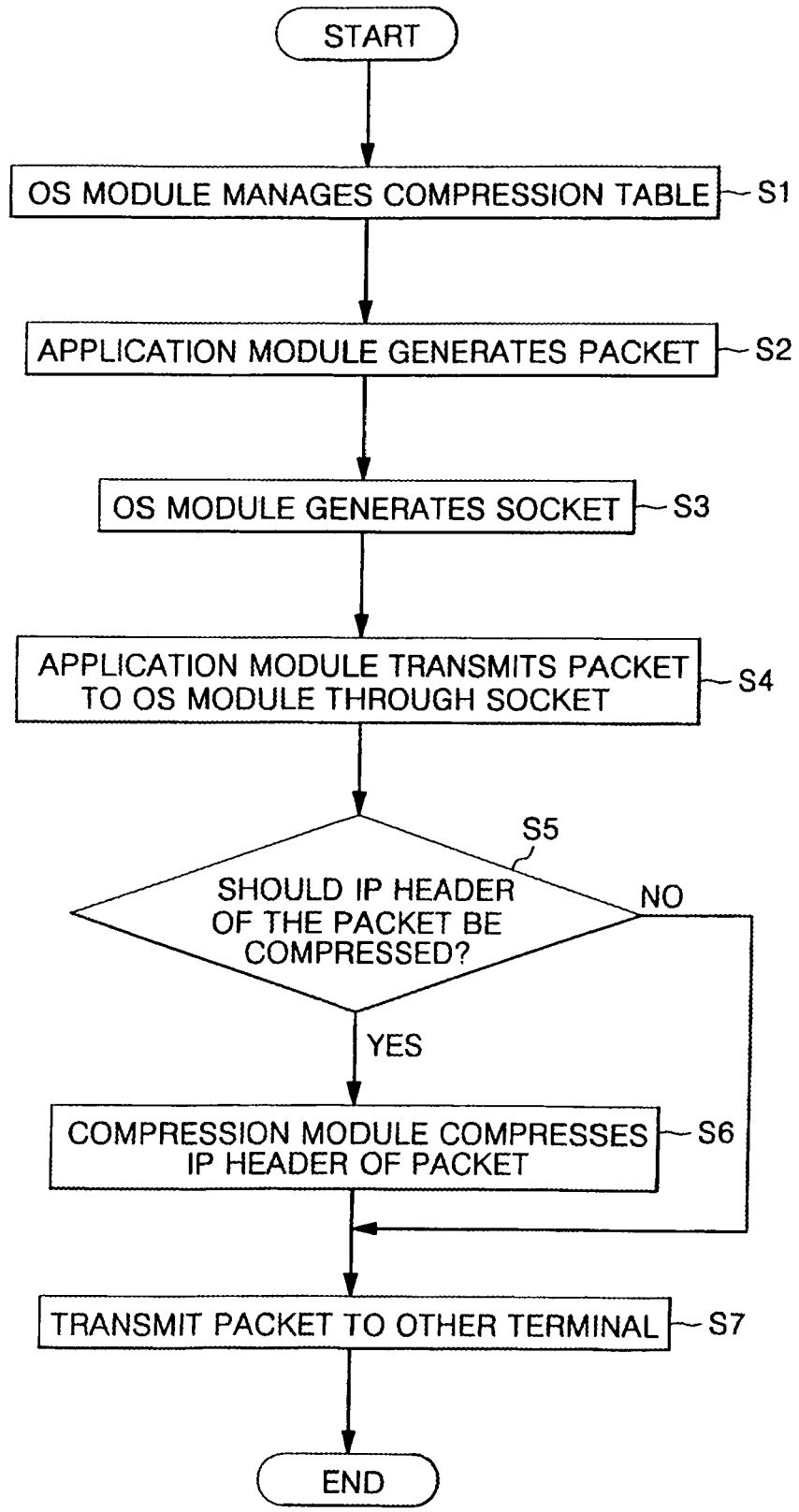
FIG. 3 is a flow chart for explaining a method for compressing an IP header of a packet transmission terminal.

FIG. 3 is a flow chart for explaining a method for compressing an IP header of the packet transmission terminal 10 of FIG. 2.

Referring to FIG. 3, the OS module 12 of the packet transmission terminal 10 manages the compression table stored in the database 17 (S1).

That is, in order to determine whether the packet received from the application module is the subject of compression or not, the compression table stored in the database 17 is managed according to a program set by a manager.

At this time, the compression table stores the IP address information and port number information of the packet received from the application module 11, and accordingly, information on whether it is to be compressed or not.

When a packet to be transmitted is generated according to the program (S2), the application module 11 transmits the generated packet to the OS module 12.

At this time, when generating the packet to be transmitted, the application module 11 transmits a socket request signal to the OS module 12, and the OS module 12 accordingly generates the socket (S3).

The OS module 12 provides the application module 11 with an option of the generated socket, and the application module 11 sets the provided option of the socket.

The application module 11 transmits the packet through the socket generated by the OS module 12 (S4).

The compression determination module 13 identifies the IP address information and port number information of the received packet, searches for whether a packet having the identified IP address information and port number information are the subject of IP header compression from the compression table stored in the database 17, and determines it (S5).

As a result of the determination, when it is determined (YES) by the compression determination module 13 the IP header of the packet received from the application module 11 has to be compressed, the compression determination module 13 transmits the packet received from the application module to 11 to the compression module 14 and the compression module 14 compresses the IP header of the packet using the IPCP (IP Compression Protocol) method or the CRTP (Compression Real-time Transport Protocol) method (S6), and the link layer module 15 then adds the link layer header to the packet.

On the other hand, when it is determined (NO) that the packet is not the subject of the IP header compression in the compression determination module 13, the compression determination module 13 transmits the packet to the link layer module 15 and the link layer module 15 adds the link layer header to the packet.

Then the physical layer module 16 adds the physical layer header to the packet, and transmits the packet to another terminal through a physically connected network (S7).

Such an IP header compression method as discussed above has some problems, however, as outlined below.

First, a transmission delay of the packet to be transmitted to another terminal device occurs. That is, when it is determined whether the packet IP header is compressed in order to transmit the packet, the quantity IP address information and port number information of the compression table of the database 17 increases according to the number of UDP/IP and TCP/IP address pairs of the packet, and accordingly there occurs the transmission delay due to a search task of database 17 for the IP address information and port number information of the packet.

Second, the delay even in a packet where the IP header of the packet is not compressed occurs. That is, since the IP header compression table with respect to all packets generated in the application module 11 needs to be searched, the packet transmission delay still occurs.

Third, when the number of the UDP/IP and TCP/IP address pairs of the packet generated in the application module 11 increases, the quantity of IP address information and port number information of the compression table stored in the database 17 increases, accordingly, and there occurs a storage area that is unnecessarily wasted.

Fourth, when it is determined whether the IP header of the packet is to be compressed by setting a specific range of the UDP port, there occurs a case that IP header compression information generated in the application modules 11 which are different with one another is not correctly determined.

That is, when it is determined whether the IP header of the packet generated using the UDP port information used by the first application module 11 is to be compressed, since a specific port region assigned in another application module 11 should be used, there occurs a case that a packet where the IP header should be compressed is to be transmitted without the compression.

Preferred embodiments of the present invention will be described herein below with reference to the accompanying drawings.

Figure 4:
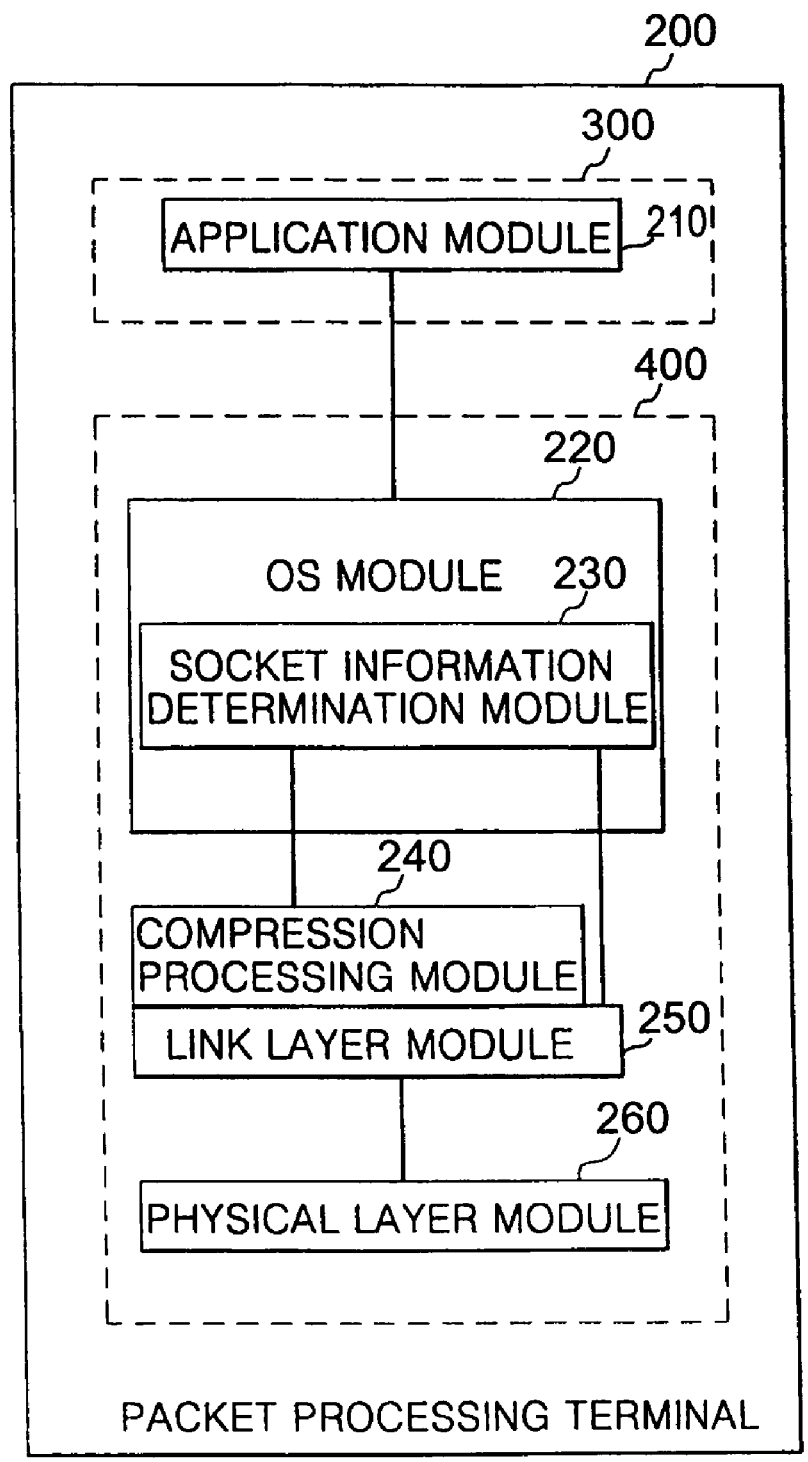
FIG. 4 is a block diagram for explaining an internal construction of a packet processing terminal in accordance with a preferred embodiment of the present invention.

FIG. 4 is a block diagram for explaining an internal construction of a packet processing terminal 200 in accordance with a preferred embodiment of the present invention.

Referring to FIG. 4, a packet processing unit 300 includes an application module 210; and a compression/decompression unit 400 includes an OS (Operation System) module 220, a compression processing module 240, a link layer module 250, and a physical layer module 260.

The OS module 22 includes a socket information determination module 230.

When a packet to be transmitted to another terminal according to a user program is generated, the application module 210 transmits a socket request signal to the OS module 220, and accordingly, sets a socket option provided from the OS module 220.

When the OS module 220 receives the socket request signal from the application module 210, it generates a socket used to receive a packet from the application module 210, and provides the application module 210 with a socket option in order to set an option of the generated socket.

At this time, it is desirable that the socket option, which the OS module 220 provides the application module 210, includes an option pertaining to and specifying a compression method of an IP header of the corresponding packet.

The following Table is used to explain an example of the socket option provided by the OS module 220 in accordance with the present invention.

TABLE

| Socket option | Description |
| --- | --- |
| SO_DEBUG | Option for recording debugging information |
| SO_REUSEADDR | Making a local address used again |
| SO_KEEPALIVE | Making a lower protocol transmit a message periodically |
| SO_DONTROUTE | Transmitting to a network interface directly without using routing |
| SO_LINGER | Specifying a processing method of a message which is not transmitted |
| SO_BROADCAST | Making a message of a broadcast format transmitted |
| SO_OOBINLINE | Specifying processing of a packet which is beyond the bandwidth |
| SO_SNDBUF | Specifying a size of a transmission buffer |
| SO_RCVBUF | Specifying a size of a reception buffer |
| SO_IPHC | Specifying an IP header compression method of a transmission packet |

As described in the foregoing Table, the socket options provided by the OS module 220 according to the socket request signal of the application module 210 is additionally provided with a 'SO_IPHC' option in which the IP header compression method of the packet is specified. The application module 210 sets a 'SO_INPO' option provided from the OS module 220, and specifies the IP header compression method of transmitted packet.

Also, each of the socket options provided by the OS module 220 is set according to the generated packet.

At this time, the IP header compression method of the packet specified by the application module 210 can correspond to a CRTP (Compressed RTP) method, an IPCP (IP Compression Protocol) method, an ROHC (Robust Header Compression) method or a user defined compression method.

Here, the user defined compression method means a method where a user of the packet processing terminal 200 newly defines a method for compressing the IP header by a reason of security or other reasons. And, when a packet processing terminal for decompressing the compressed IP header in a packet reception terminal receiving the packet uses the user defined compression method, it is understood that the packet exchange can be performed.

The application module 210 sets the socket option provided in the OS module 220, and transmits the packet through the socket generated by the OS module 220.

The socket information determination module 230 analyzes the packet transmitted from the application module 210 through the socket, and identifies socket indication information.

Figure 5:
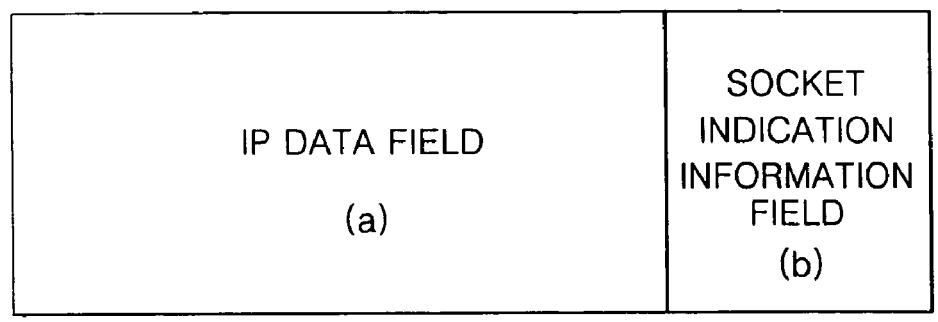
FIG. 5 is a diagram for explaining a data structure of transmission and reception packets.

FIG. 5 is a diagram for explaining a data structure of transmission and reception packets of a system.

Referring to FIG. 5, the packet transmitted from the application module 210 through the socket includes IP data field (a) and socket indication information field (b).

The IP data field (a) is information to be transmitted from the application module 210 according to a user program, and the socket indication information field (b) is information specifying position information of the socket generated by the OS module 220 in order to receive the packet from the application module 210. OS 220 determines whether the header compression option is set for the socket using the position information, and compresses the header of the packet when the header compression option is set as a result of the determination.

That is, the socket information determination module 230 analyzes the socket indication information field (b) of the packet and identifies the option information of the socket generated in order that the OS module 220 receives the packet from the application module 210.

Figure 6:
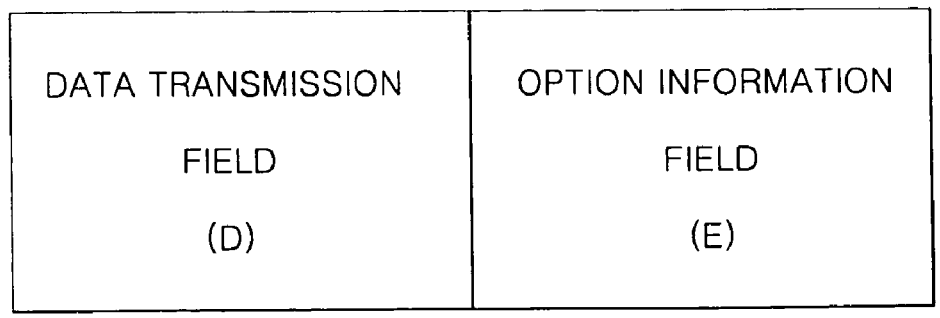
FIG. 6 is a diagram for explaining a construction of a socket generated by an OS (Operating System) module.

FIG. 6 is a diagram for explaining a construction of a socket generated by an OS module.

Referring to FIG. 6, the socket generated by the OS module 220 includes a packet data transmission field (D) and an option information field (E).

The packet data transmission field (D) is an area used to receive the packet from the application module 210, and the option information field (E) is an area used to store the option information set by the application module 210.

That is, the option information field (E) is an area used to store information of each socket option set by the application module 210.

The socket information determination module 230 identifies the socket option from the option information field (E) of the socket, and determines the 'SO_IPHC' option information specifying the IP header compression method in the identified socket option.

As a result of the determination, when the 'SO_IPHC' option is set, the socket information determination module 230 identifies the IP header compression method specified in the 'SO_IPHC' option, and transmits information on the identified IP header compression method and the received packet to the compression pressing module 240.

The compression processing module 240 compresses the IP header of the packet transmitted from the socket information determination module 230 using the IP header compression method that the application module 210 set in the 'SO_IPHC' option, and transmits the packet in which the IP header is compressed to the link layer module 250.

That is, the compression processing module 240 compresses the RTP/UDP/IP header of the packet according to the CRTP (Compressed RTP) method when the 'SO_IPHC' option set by the application module 210 is the CRTP method, compresses the RTP/UDP/IP header of the packet according to the ROHC (Robust Header Compression) method when the 'SO_IPHC' option is the ROHC method, and compresses the header of the packet according to the IPCP (IP Compression Protocol) method when the 'SO_IPHC' is the IPCP method.

The compression processing module 240 can compress the IP header of the packet using a programmed compression method when the 'SO_IPHC' option set by the application module 210 is the user defined method.

When the IP header of the packet received from other terminal is in the state of compression, the compression processing module 240 releases the compression of the IP header using the method with which other terminal compressed the IP header.

On the other hand, the socket information determination module 230 transfers the packet received from the application module 210 to the link layer module 250 when there is no information set for the 'SO_IPHC' option in the option information field (e) of the socket.

The link layer module 250 adds the link layer header to the received packet, transmits them to the physical layer module 260, and removes the link layer header of a packet received from another terminal, and transfers them to a higher layer.

At this time, the link layer module 250 adds the link layer header included in compression type information when the compression processing module 240 adds the header of the packet in which the IP header is compressed.

When it is found that the IP header of the corresponding packet is compressed by removing the link layer header of the packet received from other terminal and identifying the compression type information, the compression of the IP header can be released in the compression processing module 240 by transmitting the compression type information of the IP header to the compression processing module 240.

The physical layer module 260 adds the physical layer header to the packet transferred from the link layer module 250, and transmits them to a packet reception terminal through a physically connected network.

The physical layer module 260 removes a physical layer header of the packet received from another terminal through the physical network and transfers it to the higher layer.

At this time, a network physically connected to the physical layer module 260 corresponds to a LAN (Local Area Network), a WLAN (Wireless Local Area Network), and a WAN (Wide Area Network).

Figure 7:
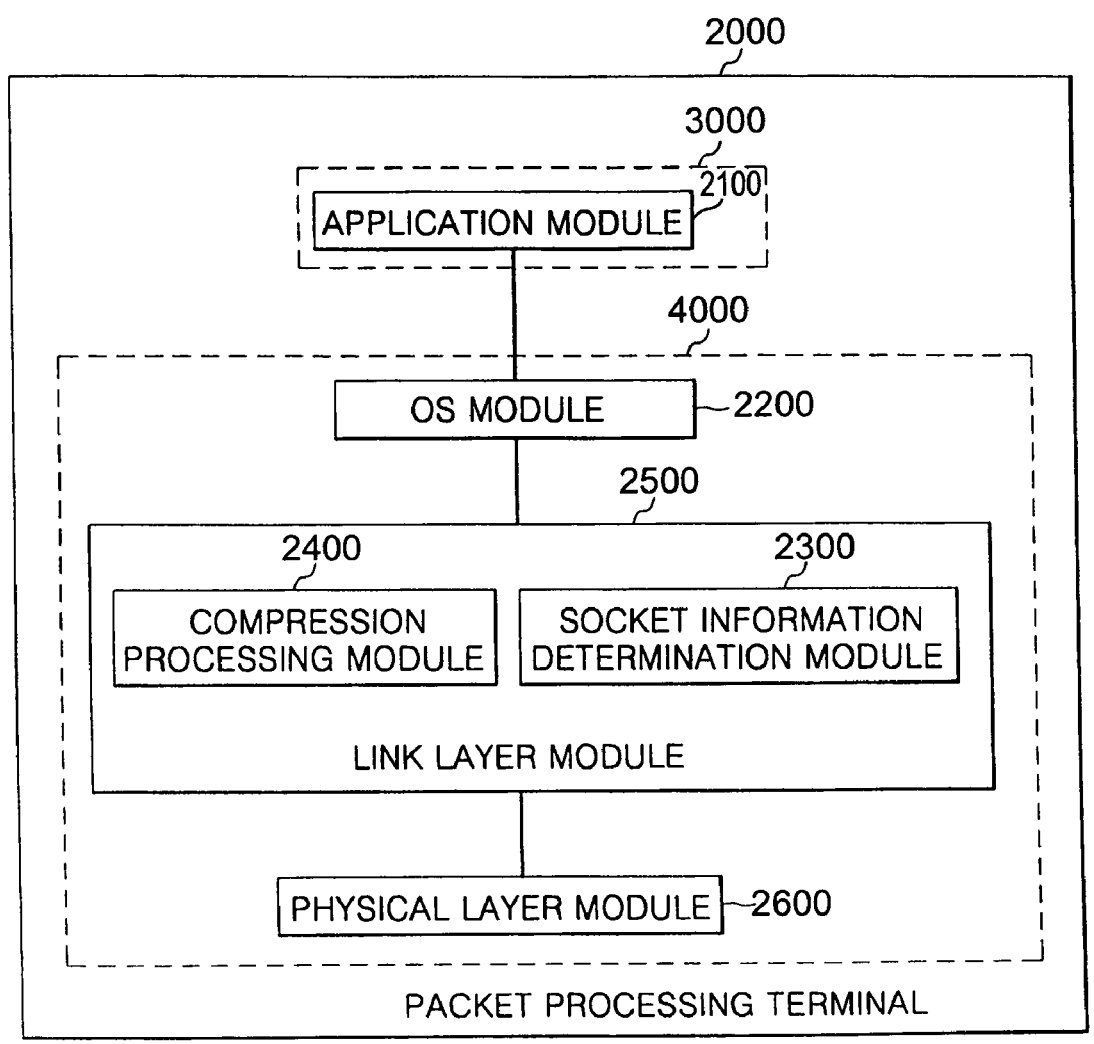
FIG. 7 is a block diagram for explaining an internal construction of a packet processing terminal in accordance with another preferred embodiment of the present invention.

FIG. 7 is a block diagram for explaining an internal construction of a packet processing terminal in accordance with another preferred embodiment of the present invention.

Referring to FIG. 7, a socket information determination module 2300 which determines whether the IP header of the packet transmitted from the application module 2100 is compressed or not using the socket option information may be optionally included (not shown) in the OS module 2200 or the link layer module 2500, as shown, in consideration of convenience of a program or a packet transmission speed by a user or manufacturer of the packet processing terminal 2000.

Figure 8:
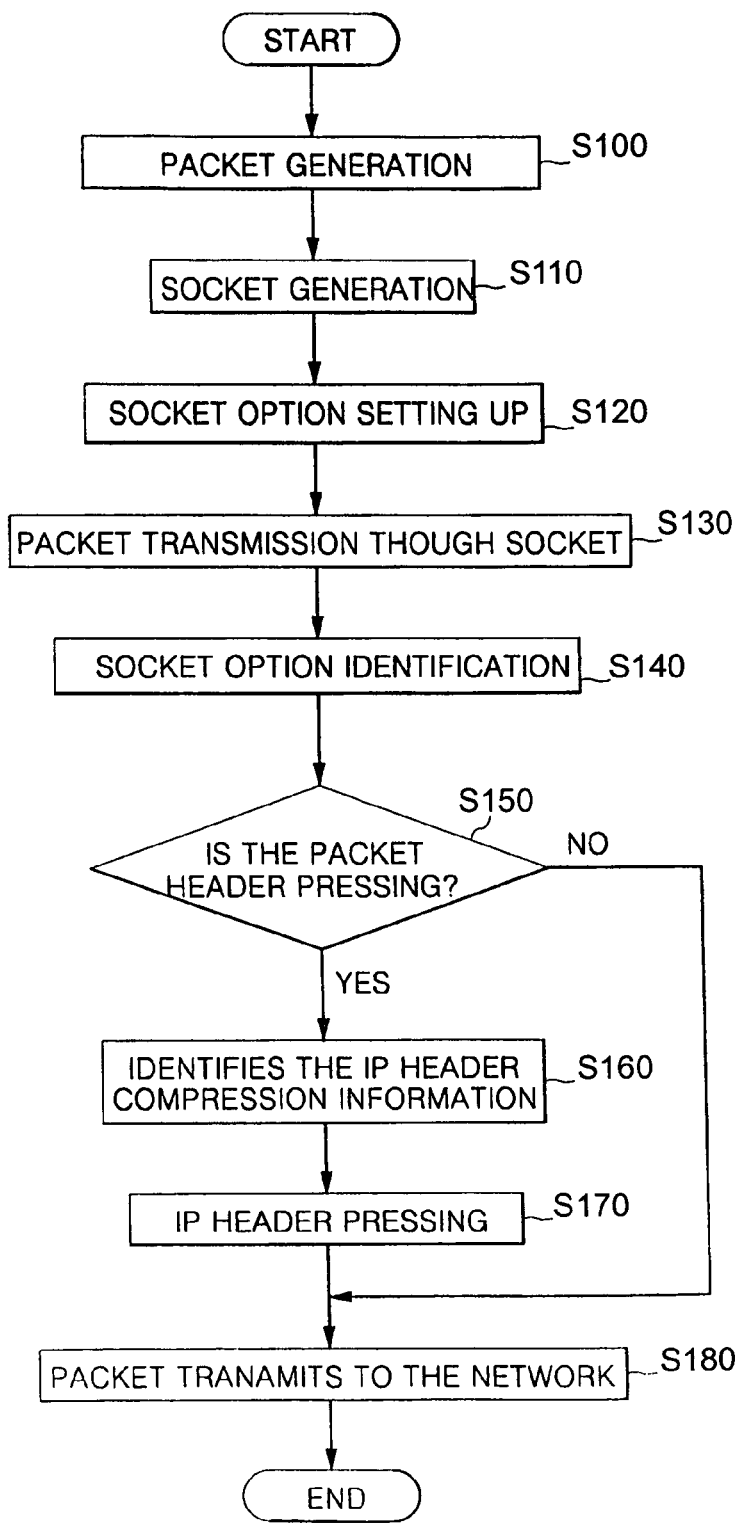
FIG. 8 is a flow chart for explaining a method for performing IP header compression of a terminal transmitting a packet in accordance with a preferred embodiment of the present invention.

FIG. 8 is a flow chart for explaining a method for performing IP header compression of a terminal transmitting a packet in accordance with a preferred embodiment of the present invention.

Referring to FIG. 8, the application module 2100 generates a packet to be transmitted to other terminal according to a user program (S100).

The application module 2100 transmits a socket request signal to transmit the generated packet to the OS module 2200.

The OS module 2200 generates a socket when the socket request signal is received from the application module 21 (S110).

The OS module 2200 provides a socket option like the previously described Table in order to set the option of the socket in which the application module 2100 is generated.

At this time, the OS module 2200 provides a socket option in which the 'OS_INHO' option specifying the IP header compression method of the packet is added according to the user program.

The application module 2100 sets the socket option provided by the OS module 2200 (S120).

The application module 2100 sets each option provided by the OS module 2200 according to the generated packet.

The application specifies a method for compressing the IP header of the packet according to the user program when there is provided the 'SO_INHO' option specifying the method for compressing the IP header of the packet from the OS module 2200.

At this time, the method for compressing the IP header of the packet set by the application module 2100 may correspond to an IPCP method, a CRTP method, an ROHC method and a user defined compression method, and it is desirable to set the same method that other terminal receiving the packet processes the IP header of the packet.

The application module 2100 transmits the packet through the socket generated by the OS module 2200 (S130).

The socket information determination module 2300 identifies information of the socket transmitted through the socket indication information field (b) of the packet and the socket option stored in the option information field (E) of the identified socket, in order to process the packet received through the socket generated by the OS module 2200 (S140).

The socket information determination module 2300 determines whether there is the 'SO_INHO' option specifying the method for compressing the IP header of the packet among the identified socket options (S150), and identifies the IP header compression information of the packet set by the application module 2100 when the 'SO_INHO' option is set (S160).

The socket information determination module 2300 transmits the packet and the IP header compression information of the corresponding packet to the compression processing module 2400, and the compression processing module 2400 compresses the IP header of the corresponding packet according to the IP header compression information (S170).

At this time, the compression processing module 2400 compresses the IP header of the packet according to the IPCP method when the IP header compression information received from the socket information determination module 2300 is the IPCP method, compresses the RTP/UDP/IP header of the packet according to the CRTP method when the compression information is the CRTP method, compresses the RTP/UDP/IP header of the packet according to the ROHC method when the compression information is the ROHC method, and compresses the IP header of the packet according to the programmed user defined compression method when the compression information is the user defined compression method.

The link layer module 2500 adds the link layer header including compression type information to the packet to which the IP header is compressed in the compression processing module 2400 and transmits them to the physical layer module 2600, and the physical layer module 2600 adds the physical layer header to the received packet and transmits them to other terminal connected to the physical network (S180).

At this time, the network in which the physical layer module 26 transmits the packet may be the LAN, the WLAN, or the WAN.

Figure 9:
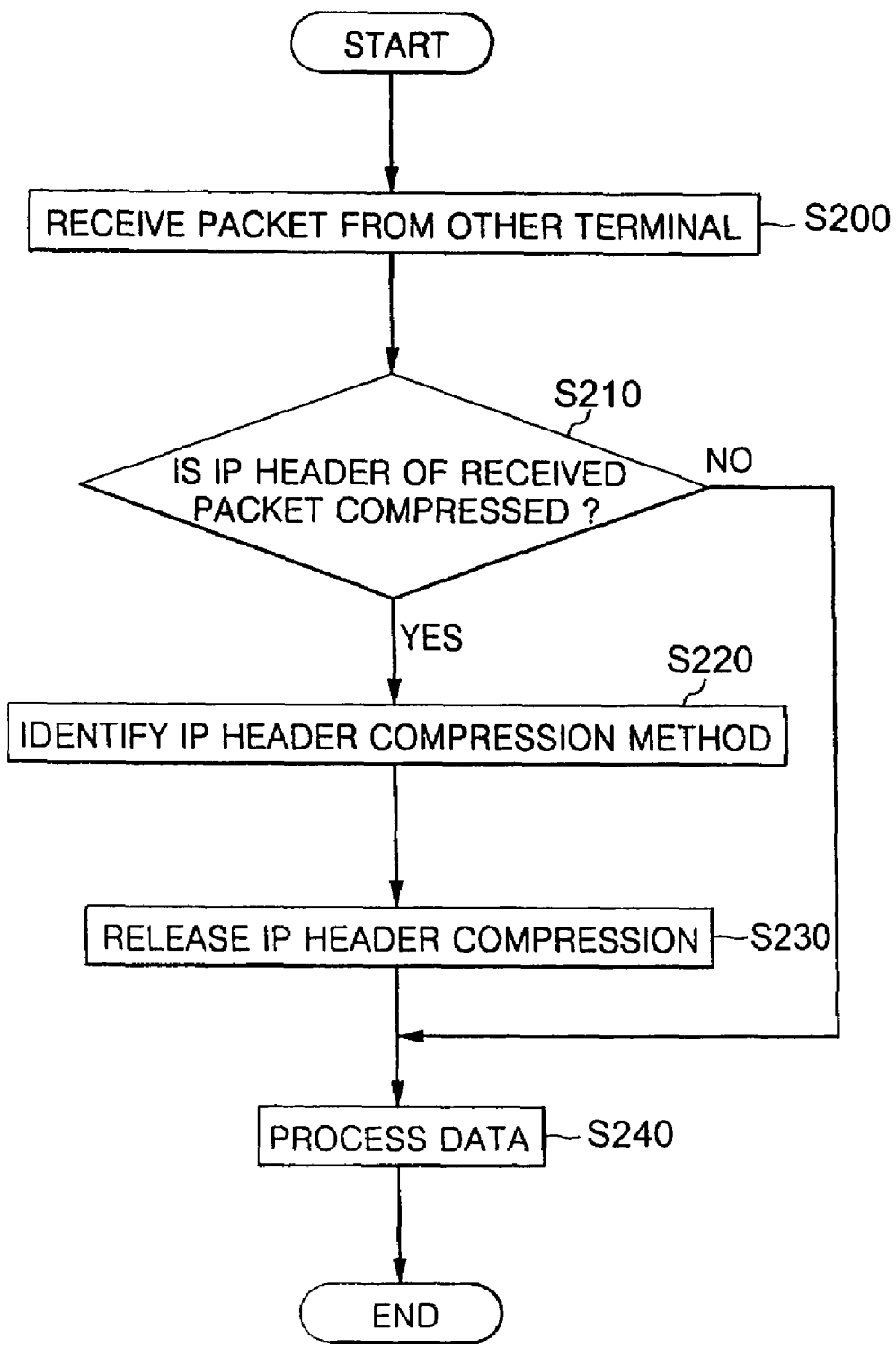
FIG. 9 is a flow chart for explaining a method for performing IP header compression of a terminal that receives a packet in accordance with an embodiment of the present invention.

FIG. 9 is a flow chart for explaining a method for performing IP header compression of a terminal that receives a packet in accordance with an embodiment of the present invention.

Referring to FIG. 9, the physical layer module 26 receives a packet from other terminal through the physical network, that is, the LAN, the WLAN, or the WAN (S200).

The physical layer module 2600 removes the physical layer header of the received packet, and the link layer module 2500 determines whether the IP header is compressed by checking compression type information of the packet while removing the link layer header of the received packet (S210).

The link layer module 2500 identifies compression method information used to compress the IP header of the corresponding packet and transmits the information to the compression processing module 2400 when the compression information is checked in the link layer header of the received packet (S220).

At this time, IP header compression method information of the packet identified by the link layer module 2500 may be IPCP method information, CRTP method information, ROHC method information and user defined compression method information.

As a result of the determination, when the IP header of the packet is compressed, the compression processing module 2400 releases (decompresses) the IP header compression according to the compression method information received from the link layer module 2500 (S230).

At this time, the compression processing module 2400 releases the compression of the IP header according to the IPCP method when the IP header compression method information received from the link layer module 2500 is the IPCP method, releases the compression of the IP header according to the ROHC method when the compression method information is the ROHC method, releases the compression of the IP header according to the CRTP method when the compression method information is the CRTP method, and releases the compression of the IP header according to the user defined compression method when the compression method information is the user defined compression method.

The application module 2100 identifies data of the packet received from other terminal and processes them (S240).

As described above, according to the present invention, when it is determined whether a terminal compresses an IP header or not in order to remove overhead of a packet to be transmitted, a delay of the packet transmission can be minimized by making the determination using socket property (option) information used in socket communication of the packet.

Also, usage efficiency of a storage area of the terminal can be maximized by removing a compression table that has to be stored in the packet base to compress the IP header of the packet and then removing the storage area that is unnecessarily wasted.

Although the preferred embodiments of the present invention have been disclosed for illustrative purposes, those skilled in the art appreciate that various modifications, additions and substitutions are possible, without departing from the scope and spirit of the invention as disclosed in the accompanying claims.

What is claimed is:

1. A packet processing terminal of a network, comprising:
   a socket option setting unit providing a socket request signal;
   a socket option providing unit providing a socket to the socket option setting unit, the socket including a socket option, when the socket request signal is received from the socket option setting unit;
   said socket option setting unit setting the socket option, and transmitting a packet, generated according to a user program, through the socket, the packet including a set socket option indicating whether a header of the packet is to be compressed or not according to the setting of the socket option; and
   a compression processing unit detecting said set socket option and compressing the header of the packet when said set socket option indicates that the header of the packet is to be compressed.

2. The packet processing terminal as set forth in claim 1, further comprising:
   a transmission processing unit for adding a transmission header to the packet to provide a header-added packet, the transmission processing unit transmitting the header-added packet to another terminal through the network.

3. The packet processing terminal as set forth in claim 2, said transmission header comprising compression method information with which the compression processing unit compresses the header of the packet.

4. The packet processing terminal as set forth in claim 2, further comprising a decompression unit for identifying a header compression method information by analyzing the transmission header of the packet and releasing the header compression of the packet according to the identified compression method information, when a packet is received from said another terminal through the network.

5. The packet processing terminal as set forth in claim 1, said socket option comprising a header compression option to specify a header compression method of the packet according to the program by the socket option setting unit.

6. The packet processing terminal as set forth in claim 1, said packet comprising a data field having information to be transmitted to another terminal, and a socket indication information field including position information of the socket generated in the compression processing unit in order for the compression processing unit to receive the packet from the socket option setting unit.

7. The packet processing terminal as set forth in claim 1, said compression processing unit detects position information of the socket from a socket indication information field of the packet, determines whether a header compression option is set to the option of the socket using the detected position information, and compresses the header of the packet when the header compression option is set as a result of the determination.

8. The packet processing terminal as set forth in claim 1, said compression processing unit compressing the header using at least one of an IPCP (Internet Protocol Compression Protocol) method, a CRTP (Compressed Real-time Transport Protocol) method, an ROHC (Robust Header Compression) method and a user defined compression method.

9. The packet processing terminal as set forth in claim 1, said network being at least one of a wired network and a wireless network.

10. The packet processing terminal as set forth in claim 1, wherein the header is at least one of an IP (Internet Protocol) header, a UDP (User Datagram Protocol) header, a TCP (Transmission Control Protocol) header, an RTP (Real-time Transport Protocol) header and an ESP (Encapsulation Security Payload) header.

11. A method for compressing a header of a packet, the method comprising steps of:
   generating a socket used to transmit a packet generated according to a user program;
   setting option information of the socket generated according to the program;
   determining whether there is compression option information used to compress the header among the set option information; and
   compressing the header of the packet using a compression method according to the compression option information, when it is determined there is compression option information used to compress the header among the set option information.

12. The method as set forth in claim 11, further comprising a step of:
   adding a transmission header in which the compression method information is loaded to the packet and transmitting the packet to another terminal through a network.

13. The method as set forth in claim 11, wherein the socket option includes a compression option in which header compression method information of the packet is specified according to the program.

14. The method as set forth in claim 13, wherein the header compression method information corresponds at least one of an IPCP (Internet Protocol Compression Protocol) method, a CRTP (Compressed Real-time Transport Protocol) method, an ROHC (Robust Header Compression) method and a user defined compression method.

15. The method as set forth in claim 11, wherein the header is at least one of an IIP (Internet Protocol) header, a UDP (User Datagram Protocol) header, a TCP (Transmission Control Protocol) header, an RTP (Real-time Transport Protocol) header and an ESP (Encapsulation Security Payload) header.

16. A packet processing terminal of a network, comprising:
   an application module generating a socket request signal when a packet is to be provided to another terminal in the network;
   an operating system module providing, in response to the socket request signal, a socket to the application module, the socket including at least one socket option;
   said application module producing a set socket option by setting the at least one socket option, and transmitting the packet, generated according to a user program, through the socket, the packet including the set socket option; and
   a compression processing module detecting said set socket option and compressing the header of the packet when said set socket option indicates that the header of the packet is to be compressed.

17. The packet processing terminal as set forth in claim 16, further comprising:
   a link layer module receiving the packet, in which the header is compressed, from said compression processing module and adding a link layer header to the received packet; and
   a physical layer module receiving the packet, in which the link layer header is added, from said link layer module and adding a physical layer header to the received packet for transmission over said network.

18. The packet processing terminal as set forth in claim 17, said link layer module comprising a socket information determination module for analyzing the packet received through the socket from the application module to identify each socket option of an option information field of the packet, and determine whether said set socket option is indicative of 'SO_IPHC' option information specifying a header compression method, and providing said set socket option to said compression processing module.

19. The packet processing terminal as set forth in claim 18, the header compression method comprising one of an TPCP (Internet Protocol Compression Protocol) method, a CRTP (Compressed Real-time Transport Protocol) method, an ROHC (Robust Header Compression) method and a user defined compression method.

20. The packet processing terminal as set forth in claim 19, the header being one of an IP (Internet Protocol) header, a UDP (User Datagram Protocol) header, a TCP (Transmission Control Protocol) header, an RTP (Real-time Transport Protocol) header and an ESP (Encapsulation Security Payload) header.

21. The packet processing terminal as set forth in claim 16, said operating system module comprising a socket information determination module for analyzing the packet received through the socket from the application module to identify each socket option of an option information field of the packet, and determine whether said set socket option is indicative of 'SO_IPHC' option information specifying a header compression method, and providing said set socket option to said compression processing module.

22. The packet processing terminal as set forth in claim 21, the header compression method comprising one of an TPCP (Internet Protocol Compression Protocol) method, a CRTP (Compressed Real-time Transport Protocol) method, an ROHC (Robust Header Compression) method and a user defined compression method.

23. The packet processing terminal as set forth in claim 22, the header being one of an IP (Internet Protocol) header, a UDP (User Datagram Protocol) header, a TCP (Transmission Control Protocol) header, an RTP (Real-time Transport Protocol) header and an ESP (Encapsulation Security Payload) header.

* * * * *